(12) United States Patent
Cao

(10) Patent No.: US 10,025,448 B2
(45) Date of Patent: Jul. 17, 2018

(54) INFORMATION EXCHANGE METHOD, USER END, AND SYSTEM FOR ONLINE COLLABORATIVE SHOPPING

(71) Applicant: Huawei Technologies Co., Ltd., Shenzhen, Guangdong (CN)

(72) Inventor: Leilei Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 334 days.

(21) Appl. No.: 14/946,232

(22) Filed: Nov. 19, 2015

(65) Prior Publication Data

US 2016/0078508 A1 Mar. 17, 2016

Related U.S. Application Data

(63) Continuation of application No. 14/140,966, filed on Dec. 26, 2013, now Pat. No. 9,211,239, which is a
(Continued)

(30) Foreign Application Priority Data

Jul. 10, 2012 (CN) .......................... 2012 1 0236673

(51) Int. Cl.
*G06F 3/048* (2013.01)
*G06Q 30/00* (2012.01)
(Continued)

(52) U.S. Cl.
CPC .............. *G06F 3/048* (2013.01); *G06F 3/01* (2013.01); *G06Q 30/0605* (2013.01);
(Continued)

(58) Field of Classification Search
CPC ........... G06Q 30/06; G06Q 30/0601–30/0643; G06Q 30/08; G06F 3/00; G06F 3/001;
(Continued)

(56) References Cited

U.S. PATENT DOCUMENTS 5,917,472 A 6/1999 Perala
5,940,082 A * 8/1999 Brinegar .............. G06Q 10/107
345/442

(Continued)

FOREIGN PATENT DOCUMENTS

CN 1581187 A 2/2005
CN 101681468 A 3/2010
(Continued)

OTHER PUBLICATIONS

Mark Ashdown, et al., "Remote collaboration on desk-sized displays", Computer Animation and Virtual Worlds, 2005, p. 41-51.

*Primary Examiner* — William J Allen

(57) ABSTRACT

The present invention provides an information exchange method, a user end, and a system for online collaborative shopping. The method includes: sending a collaborative shopping request message that includes one or more user identifiers to a collaborative server; receiving a collaborative shopping startup message; submitting a shopping web page of the main control user to the collaborative server, and submitting, to the collaborative server, operation information generated when a user of the main control user end operates a shopping web page; and receiving operation information generated when a user on the collaborative user end operates a shopping web page according to a commodity feature concerned by the user on the shopping web page, and displaying, on the shopping web page, an operation result of the user on the collaborative user end for the shopping web page.

10 Claims, 10 Drawing Sheets

Related U.S. Application Data continuation of application No. PCT/CN2013/073890, filed on Apr. 8, 2013.

(51) Int. Cl.
*G06Q 30/06* (2012.01)
*G06F 3/01* (2006.01)
*H04L 29/08* (2006.01)
*G06Q 10/10* (2012.01)

(52) U.S. Cl.
CPC ..... *G06Q 30/0623* (2013.01); *G06Q 30/0641* (2013.01); *H04L 67/02* (2013.01); *H04L 67/22* (2013.01); *G06Q 10/101* (2013.01)

(58) Field of Classification Search
CPC ...... G06F 3/048–3/04897; H04L 67/02; H04L 67/06; H04L 67/14; H04L 67/22; H04L 67/24; H04L 67/104; H04L 67/306; H04L 29/06; H04L 29/06027; H04L 65/403; H04L 65/4076; H04L 69/16; H04L 12/58; H04L 12/1822; H04L 51/04; H04L 51/32; H04L 41/22
See application file for complete search history.

(56) References Cited

U.S. PATENT DOCUMENTS

| | | |
|---|---|---|
| 7,814,029 B1 | 10/2010 | Siegel |
| 8,539,339 B2 | 9/2013 | Lloyd et al. |
| 8,627,211 B2 | 1/2014 | Kropivny |
| 9,211,239 B2* | 12/2015 | Cao ................ G06Q 30/0641 |
| 2002/0080172 A1 | 6/2002 | Viertl |
| 2005/0033656 A1 | 2/2005 | Wang et al. |
| 2006/0122895 A1 | 6/2006 | Abraham et al. |
| 2008/0148184 A1 | 6/2008 | Davis |
| 2008/0183819 A1 | 7/2008 | Gould et al. |
| 2009/0043674 A1 | 2/2009 | Minsky et al. |
| 2009/0265255 A1 | 10/2009 | Jackson et al. |
| 2009/0287588 A1* | 11/2009 | Ourega Dobe .... G06Q 30/0601 705/26.1 |
| 2010/0030578 A1 | 2/2010 | Siddique et al. |
| 2010/0299616 A1 | 11/2010 | Chen |
| 2011/0107263 A1 | 5/2011 | Ivanov |
| 2011/0161182 A1* | 6/2011 | Racco ............... G06Q 30/0277 705/14.73 |
| 2011/0178889 A1 | 7/2011 | Abraham et al. |
| 2011/0289155 A1 | 11/2011 | Pirnazar |
| 2012/0072304 A1 | 3/2012 | Homan |
| 2013/0132240 A1 | 5/2013 | Aguilar |
| 2013/0173433 A1 | 7/2013 | Moghadam et al. |
| 2013/0268331 A1 | 10/2013 | Bitz et al. |

FOREIGN PATENT DOCUMENTS

| | | |
|---|---|---|
| CN | 101867619 A | 10/2010 |
| CN | 102779306 A | 11/2012 |
| WO | WO 2009/145398 A1 | 12/2009 |

* cited by examiner

INFORMATION EXCHANGE METHOD, USER END, AND SYSTEM FOR ONLINE COLLABORATIVE SHOPPING

CROSS-REFERENCE TO RELATED APPLICATIONS

This application is a continuation of U.S. patent application Ser. No. 14/140,966, filed on Dec. 26, 2013, which is a continuation of International Application No. PCT/CN2013/073890, filed on Apr. 8, 2013. The International Application claims priority to Chinese Patent Application No. 201210236673.8, filed on Jul. 10, 2012. The afore-mentioned patent applications are hereby incorporated by reference in their entireties.

TECHNICAL FIELD

Embodiments of the present invention relate to communications technologies, and in particular, to an information exchange method, a user end, and a system for online collaborative shopping.

BACKGROUND

Based on a technical solution provided by a mainstream online shopping system, an online shopping process of a user is as follows: A manufacturer publishes commodity information on the Internet; the user views, through a browser, the information and related information shared by another user; if the user intends to purchase a commodity, the user puts the commodity into a "shopping cart", fills in a delivery address, and makes an online payment; the manufacturer sends the commodity to the user by using the logistics; and both transaction parties evaluate each other. Then, a transaction is complete.

Based on a technical solution provided by an online shopping system in a group purchase mode, an online shopping process of a user is as follows: A header finds a commodity for starting a group purchase, determines the number of required persons of the group purchase and detailed commodity information, and publishes group purchase information on the Internet to convene a member that has a same purchase intention; the user views, through a browser, the information and related information shared by another user; if the user intends to purchase the commodity, the user may join the group; after the number of members reaches the number of required persons, the user pays the header, and meanwhile, gets the commodity or a related note; and the user may evaluate the commodity after using it. Then, a transaction is done.

However, based on an existing online shopping system, when browsing a commodity on a shopping web page, a user can only communicate with a friend by sending a screenshot, a picture, and a commodity link, and cannot directly communicate with another user to intuitively exchange a feature of the commodity on the shopping web page where the browsed commodity is located. As a result, the user cannot acquire valid purchase information and advice for the commodity from the other user.

SUMMARY

Embodiments of the present invention provide an information exchange method, a user end and a system for online collaborative shopping, which are used to establish a real-time communication connection with another user when a user performs online shopping, so as to achieve a purpose of performing online shopping with the assistance of the another user.

In one aspect, the present invention provides an information exchange method for online collaborative shopping, where the method includes:

sending, by a main control user, a collaborative shopping request message, where the collaborative shopping request message includes one or more user identifiers, and the one or more user identifiers are used to determine a collaborative user requested to collaborate in shopping;

receiving, by the main control user, a first response message for responding to the collaborative shopping request message by the collaborative user corresponding to the one or more user identifiers;

transmitting, by the main control user, collaborative information to the collaborative user according to the first response message, where the collaborative information includes shopping information of the main control user, so that the collaborative user synchronously shares or acquires the shopping information of the main control user; or receiving, by the main control user according to the first response message, collaborative information sent by the collaborative user, so that the main control user synchronously shares or acquires shopping information of the collaborative user, where the collaborative information includes the shopping information of the collaborative user.

In one aspect, the present invention provides a main control user end, including:

a transmission module, configured to send a collaborative shopping request message, where the collaborative shopping request message includes one or more user identifiers, the one or more user identifiers are used to determine a collaborative user requested to collaborate in shopping, and the transmission module is further configured to receive a first response message for responding to the collaborative shopping request message by the collaborative user corresponding to the one or more user identifiers, and send the first response message to a collaborative information transmission module; and the collaborative information transmission module, configured to transmit collaborative information to the collaborative user according to the first response message, where the collaborative information includes shopping information of the main control user, so that the collaborative user synchronously shares or acquires the shopping information of the main control user; or configured to receive, according to the first response message, collaborative information sent by the collaborative user, so that the main control user synchronously shares or acquires shopping information of the collaborative user, where the collaborative information includes the shopping information of the collaborative user.

In another aspect, the present invention further provides an information exchange method for online collaborative shopping, where the method includes:

receiving, by a collaborative user, a collaborative shopping request message sent by a main control user, where the collaborative shopping request message includes one or more user identifiers, and the one or more user identifiers are used to determine a collaborative user requested to collaborate in shopping;

sending, by the collaborative user to the main control user with a first response message for responding to the collaborative shopping request message;

receiving, by the collaborative user, collaborative information transmitted by the main control user according to the first response message, so as to synchronously share or acquire shopping information of the main control user, where the collaborative information includes the shopping information of the main control user; or sending, by the collaborative user, collaborative information to the main control user, where the collaborative information includes shopping information of the collaborative user, so that the main control user synchronously shares or acquires the shopping information of the collaborative user.

In another aspect, the present invention further provides a collaborative user end, including:

a transmission module, configured to receive a collaborative shopping request message sent by a main control user, where the collaborative shopping request message includes one or more user identifiers, the one or more user identifiers are used to determine a collaborative user requested to collaborate in shopping, and the transmission module is further configured to send to the main control user with a first response message for responding to the collaborative shopping request message; and a collaborative information transmission module, configured to, after the transmission module sends to the main control user with the first response message for responding to the collaborative shopping request message, receive collaborative information transmitted by the main control user according to the first response message, so as to synchronously share or acquire shopping information of the main control user, where the collaborative information includes the shopping information of the main control user; or send collaborative information to the main control user, where the collaborative information includes shopping information of the collaborative user, so that the main control user synchronously shares or acquires the shopping information of the collaborative user.

In still another aspect, the present invention further provides a collaborative shopping system, including the collaborative user end and the main control user end.

Through the technical solutions provided in the present invention, a main control user sends a collaborative shopping request message to one or more collaborative users, and establishes a communication connection with the one or more collaborative users, to form a collaborative shopping group. After the group is formed, the main control user transmits collaborative information that includes shopping information of the main control user to a collaborative user in the group, so that the collaborative user synchronously shares the shopping information of the main control user, or acquires the shopping information of the main control user. Similarly, the collaborative user may also proactively transmit collaborative information that includes shopping information of the collaborative user to the main control user, so that the main control user synchronously shares the shopping information of the collaborative user, or acquires the shopping information of the collaborative user. The collaborative user may assist, according to the shopping information of the main control user, the main control user in performing online shopping, so that the main control user purchases a suitable commodity.

DETAILED DESCRIPTION

Technical solutions provided in the present invention apply to multiple fields of network activities, for example, multiple persons collaboratively perform shopping over a network, or multiple persons collaboratively watch a movie over a network. The present invention takes that multiple persons collaboratively perform shopping over the network as an example for description. During online shopping, a user that proactively invites another user to assist the user itself in performing shopping, that is, a user that initiates collaborative shopping, is called a main control user. The other user invited to collaborate in the shopping is called a collaborative user.

Figure 1:
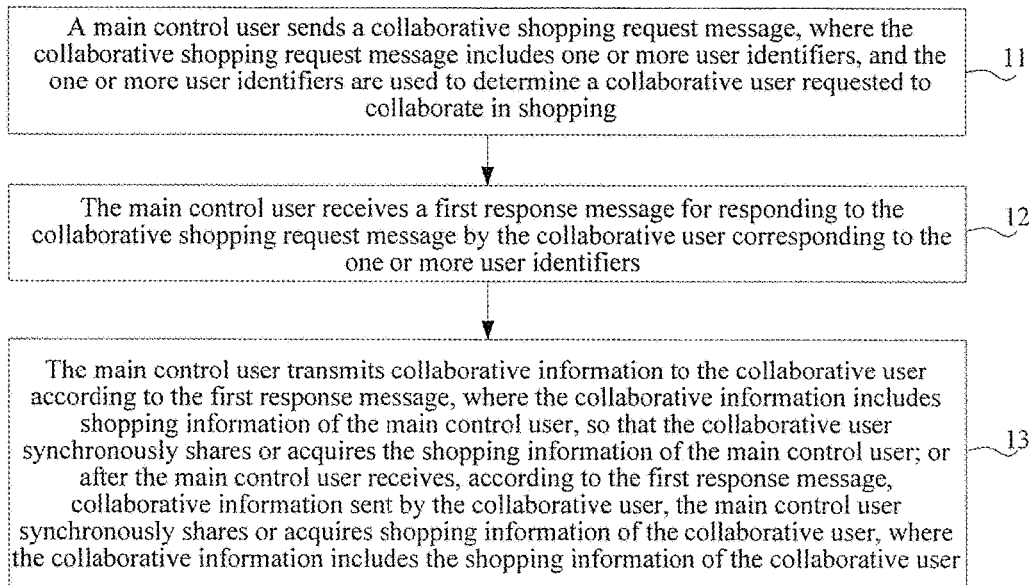
FIG. 1 is a flowchart of an information exchange method for online collaborative shopping according to an embodiment of the present invention.

FIG. 1 is a flowchart of an information exchange method for online collaborative shopping according to an embodiment of the present invention. This embodiment describes, from a perspective of a main control user, a method for exchanging information between the main control user and a collaborative user during online collaborative shopping. As shown in FIG. 1, the method provided in this embodiment includes:

Step 11: A main control user sends a collaborative shopping request message, where the collaborative shopping request message includes one or more user identifiers, and the one or more user identifiers are used to determine a collaborative user requested to collaborate in shopping.

The collaborative shopping request message includes a user identifier registered by an invited user, and one or more collaborative users may be invited.

Step 12: The main control user receives a first response message for responding to the collaborative shopping request message by the collaborative user corresponding to the one or more user identifiers.

After the main control user receives a first response message returned by each collaborative user for agreeing to an invitation, a communication connection is established between the main control user and each collaborative user to forma collaborative shopping group.

Step 13: The main control user transmits collaborative information to the collaborative user according to the first response message, where the collaborative information includes shopping information of the main control user, so that the collaborative user synchronously shares or acquires the shopping information of the main control user; or after the main control user receives, according to the first response message, collaborative information sent by the collaborative user, the main control user synchronously shares or acquires shopping information of the collaborative user, where the collaborative information includes the shopping information of the collaborative user.

After receiving the first response message returned by the collaborative user for agreeing to the invitation, the main control user may proactively transmit local shopping information to the collaborative user and proactively request shopping assistance from the collaborative user. After returning the first response message for agreeing to the invitation to the main control user and when brows ing a target commodity, the collaborative user may also proactively transmit local shopping information to the main control user and proactively provide shopping assistance for the main control user.

When the main control user transmits the collaborative information to the collaborative user, the collaborative user may synchronously share the shopping information of the main control user. For example, the collaborative user receives the collaborative information in real time and presents the collaborative information on the local end in real time. The main control user and the collaborative user may exchange the shopping information in real time during a shopping process. The collaborative user may also asynchronously share the shopping information of the main control user. For example, after the main control user transmits the collaborative information to an offline collaborative user, the offline collaborative user presents the collaborative information on the local end after going online. After the group is formed, the main control user and the collaborative user exchange shopping information in a non-real-time manner.

Similarly, when the collaborative user transmits the collaborative information to the main control user, the main control user may synchronously share the shopping information of the collaborative user, and may also asynchronously share the shopping information of the collaborative user.

In the information exchange method provided in this embodiment, a main control user sends a collaborative shopping request message to one or more collaborative users, and establishes a communication connection with the one or more collaborative users, to form a collaborative shopping group. After the group is formed, the main control user transmits collaborative information that includes shopping information of the main control user to a collaborative user in the group, so that the collaborative user synchronously shares the shopping information of the main control user, or acquires the shopping information of the main control user. Similarly, the collaborative user may also proactively transmit collaborative information that includes shopping information of the collaborative user to the main control user, so that the main control user synchronously shares the shopping information of the collaborative user, or acquires the shopping information of the collaborative user. The collaborative user may assist, according to the shopping information of the main control user, the main control user in performing online shopping, so that the main control user purchases a suitable commodity.

Figure 2:
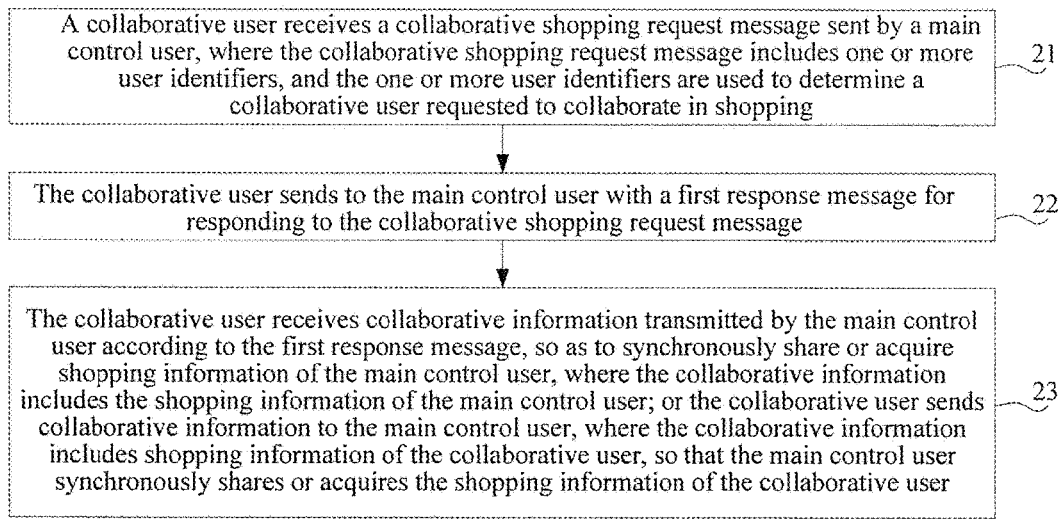
FIG. 2 is a flowchart of another information exchange method for online collaborative shopping according to an embodiment of the present invention.

FIG. 2 is a flowchart of another information exchange method for online collaborative shopping according to an embodiment of the present invention. This embodiment mainly describes the information exchange method from a perspective of a collaborative user. As shown in FIG. 2, the method includes:

Step 21: A collaborative user receives a collaborative shopping request message sent by a main control user, where the collaborative shopping request message includes one or more user identifiers, and the one or more user identifiers are used to determine a collaborative user requested to collaborate in shopping.

Step 22: The collaborative user sends to the main control user with a first response message for responding to the collaborative shopping request message.

Step 23: The collaborative user receives collaborative information transmitted by the main control user according to the first response message, so as to synchronously share or acquire shopping information of the main control user, where the collaborative information includes the shopping information of the main control user; or the collaborative user sends collaborative information to the main control user, where the collaborative information includes shopping information of the collaborative user, so that the main control user synchronously shares or acquires the shopping information of the collaborative user.

After receiving the first response message returned by the collaborative user for agreeing to an invitation, the main control user may proactively transmit local shopping information to the collaborative user and proactively request shopping assistance from the collaborative user. After returning the first response message for agreeing to the invitation to the main control user, the collaborative user may also proactively transmit local shopping information to the main control user and proactively provide shopping assistance for the main control user.

When the main control user transmits the collaborative information to the collaborative user, the collaborative user may synchronously share the shopping information of the main control user. For example, the collaborative user receives the collaborative information in real time and presents the collaborative information on the local end in real time. The main control user and the collaborative user may exchange the shopping information in real time during a shopping process. The collaborative user may also asynchronously share the shopping information of the main control user. For example, after the main control user transmits the collaborative information to an offline collaborative user, the offline collaborative user presents the collaborative information on the local end after going online.

After the group is formed, the main control user and the collaborative user exchange shopping information in a non-real-time manner.

Similarly, when the collaborative user transmits the collaborative information to the main control user, the main control user may synchronously share the shopping information of the collaborative user, and may also asynchronously share the shopping information of the collaborative user.

In the information exchange method provided in this embodiment, after a collaborative user receives a collaborative shopping request message sent by a main control user and returns a first response message for agreeing to an invitation to the main control user, a communication connection is established between the collaborative user and the main control user to form a collaborative shopping group. After the group is formed, the main control user transmits collaborative information that includes shopping information of the main control user to a collaborative user in the group, so that the collaborative user synchronously shares the shopping information of the main control user or acquires the shopping information of the main control user. Similarly, the collaborative user may also proactively transmit collaborative information that includes shopping information of the collaborative user to the main control user, so that the main control user synchronously shares the shopping information of the collaborative user or acquires the shopping information of the collaborative user. The collaborative user may assist, according to the shopping information of the main control user, the main control user in performing online shopping, so that the main control user purchases a suitable commodity.

Preferably, in the embodiments corresponding to FIG. 1 and FIG. 2, in a case that a collaborative user synchronously shares shopping information of a main control user, shopping information transmitted by the main control user to the collaborative user includes link information of a current shopping interface of the main control user, so that the collaborative user presents the current shopping interface of the main control user. The collaborative user presents the current shopping interface of the main control user on the local end according to the link information of the current shopping interface provided by the main control user. Preferably, the current shopping interface may be an interface presenting property information of one or more commodities selected by the main control user. The collaborative user may learn, through the presented interface, the property information of the one or more commodities selected by the main control user. The property information includes several fields. The fields separately indicate commodity specification information, commodity color information, commodity style information, and commodity price information. Further, when the main control user needs to end the collaborative shopping, the main control user may send the collaborative user end a request for exiting a collaborative shopping interface. Similarly, when the collaborative user needs to exit the collaborative shopping, the collaborative user may also send the main control user a request for exiting a collaborative shopping interface.

Preferably, in the embodiments corresponding to FIG. 1 and FIG. 2, in a case that a main control user synchronously shares shopping information of a collaborative user, the shopping information of the collaborative user includes link information of a current shopping interface of the collaborative user, so that the main control user presents the current shopping interface of the collaborative user. The main control user presents the current shopping interface of the collaborative user on the local end according to the link information of the current shopping interface provided by the collaborative user. Preferably, the current shopping interface may be an interface presenting property information of one or more commodities selected by the collaborative user. The main control user may learn, through the presented interface, the property information of the one or more commodities selected by the collaborative user. The property information includes several fields. The fields separately indicate commodity specification information, commodity color information, commodity style information, and commodity price information. Further, when the main control user needs to end the collaborative shopping, the main control user may send the collaborative user end a request for exiting the collaborative shopping interface. Similarly, when the collaborative user needs to exit the collaborative shopping, the main control user may also receive, from the collaborative user end, a request for exiting the collaborative shopping interface.

In the embodiments corresponding to FIG. 1 and FIG. 2, preferably, in a case that a collaborative user asynchronously shares shopping information of a main control user, the main control user may transmit property information of a commodity selected by the main control user to a virtual shopping basket, e-mail, or a message receiver box of the collaborative user. The collaborative user may acquire, from the virtual shopping basket, the e-mail, or the message receiver box, property information of one or more commodities selected by the main control user.

Preferably, after the main control user transmits the collaborative information to the collaborative user and when the main control user selects a target commodity, the main control user may further send the collaborative user a virtual shopping basket parameter and an association relationship between the virtual shopping basket and the one or more commodities selected by the main control user, so that the collaborative user generates a virtual shopping basket associated with the one or more commodities, and the virtual shopping basket of the collaborative user includes the commodity selected by the main control user, thereby implementing the collaborative shopping between the main control user and the collaborative user.

Figure 3:
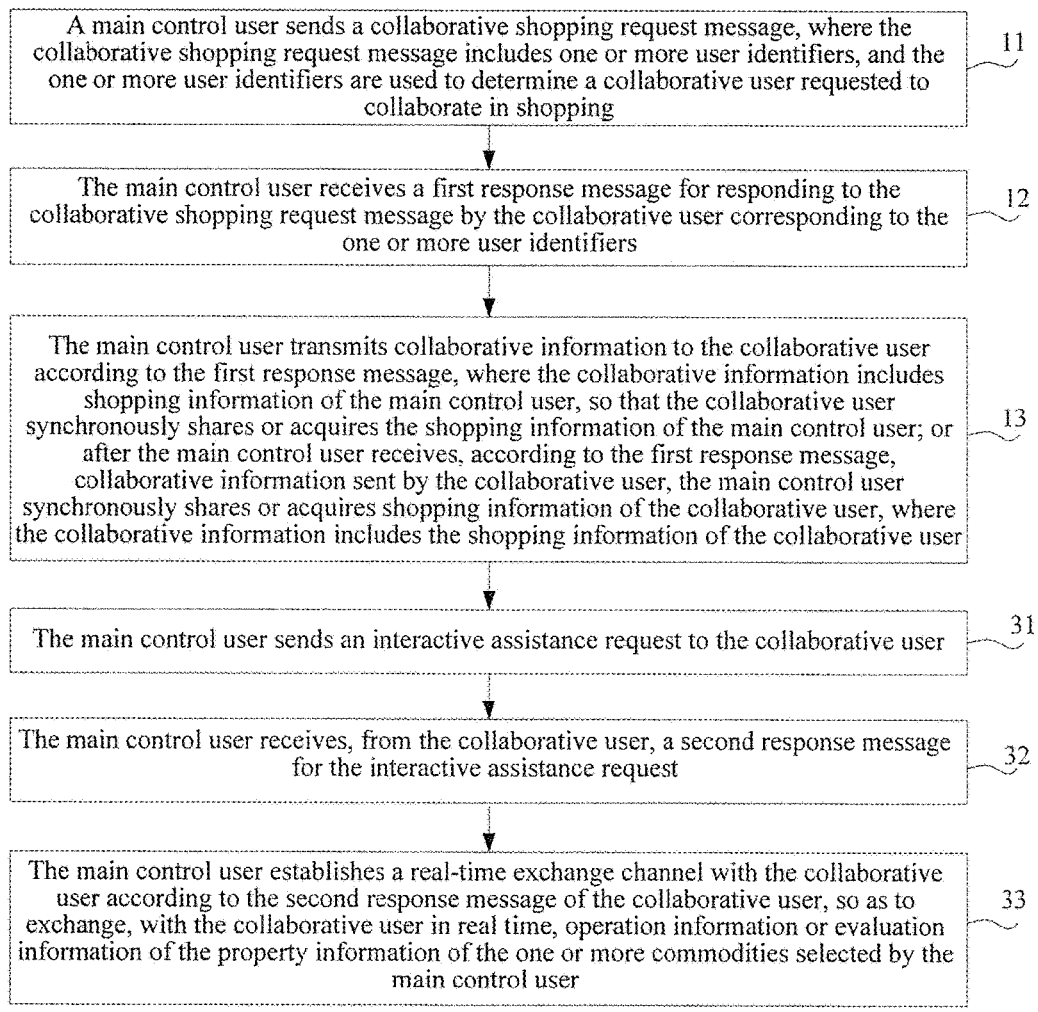
FIG. 3 is a flowchart of still another information exchange method for online collaborative shopping according to an embodiment of the present invention.

FIG. 3 is a flowchart of still another information exchange method for online collaborative shopping according to an embodiment of the present invention. As shown in FIG. 3, after step 13, the method further includes:

Step 31: The main control user sends an interactive assistance request to the collaborative user.

Step 32: The main control user receives, from the collaborative user, a second response message for the interactive assistance request.

After receiving the interactive assistance request of the main control user, if the collaborative user agrees to interactive assistance, the collaborative user returns the second response message for the interactive assistance request to the main control user.

Step 33: The main control user establishes a real-time exchange channel with the collaborative user according to the second response message of the collaborative user, so as to exchange, with the collaborative user in real time, operation information or evaluation information of the property information of the one or more commodities selected by the main control user.

The main control user establishes the real-time exchange channel with the collaborative user according to the second response message of the collaborative user in multiple manners, which may specifically include, but are not limited to, the following methods:

A method is that the main control user exchanges, with the collaborative user in real time according to the second response message of the collaborative user and by sharing a cursor or through voice communication, the operation information or evaluation information of the property information of the one or more commodities selected by the main control user.

Another method is that the main control user exchanges, with the collaborative user in real time according to the second response message of the collaborative user and both by sharing a cursor and through voice communication with the collaborative user, the operation information or evaluation information of the property information of the one or more commodities selected by the main control user.

Still another method is that the main control user exchanges, with the collaborative user in real time according to the second response message of the collaborative user and by using a paintbrush, the evaluation information of the property information of the one or more commodities selected by the main control user. For example, the main control user and the collaborative user mark a commodity with a diagram or a text according to a requirement, and highlight some details. The main control user and the collaborative user synchronously present commodity details marked by the other side, so as to facilitate analysis of the commodity details.

The sharing the cursor refers to that the collaborative user end synchronously presents a cursor of the main control user and a movement process of the cursor, or may also refers to that both the main control user and the collaborative user mutually present a cursor of the other side and a moving process of the cursor.

Figure 4:
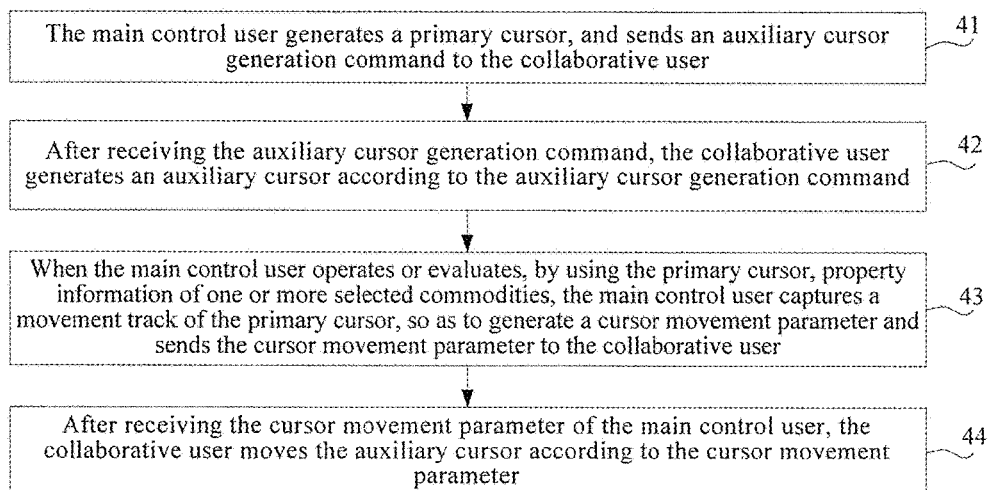
FIG. 4 is a flowchart of a real-time exchange method by sharing a cursor by a main control user and a collaborative user according to an embodiment of the present invention.

FIG. 4 is a flowchart of a real-time exchange method by sharing a cursor by a main control user and a collaborative user according to an embodiment of the present invention. As shown in FIG. 4, the method provided in this embodiment includes:

Step 41: The main control user generates a primary cursor, and sends an auxiliary cursor generation command to the collaborative user.

Step 42: After receiving the auxiliary cursor generation command, the collaborative user generates an auxiliary cursor according to the auxiliary cursor generation command.

Step 43: When the main control user operates or evaluates, by using the primary cursor, property information of one or more selected commodities, the main control user captures a movement track of the primary cursor, so as to generate a cursor movement parameter and sends the cursor movement parameter to the collaborative user.

Step 44: After receiving the cursor movement parameter of the main control user, the collaborative user moves the auxiliary cursor according to the cursor movement parameter.

For example, when the main control user uses the primary cursor to locate some areas of a commodity on a collaborative shopping interface, a collaborative shopping interface of the collaborative user synchronously displays a movement process of the primary cursor of the main control user. For another example, when the main control user zooms in or zooms out on a commodity picture on the collaborative shopping interface, a commodity picture presented on the collaborative shopping interface of the collaborative user is synchronously zoomed in or zoomed out.

Through the method provided in this embodiment, an auxiliary cursor of a collaborative user end and a primary cursor of a main control user synchronously move, so that the collaborative user may acquire, in real time, operation information or evaluation information of property information of one or more commodities selected by the main control user.

Figure 5:
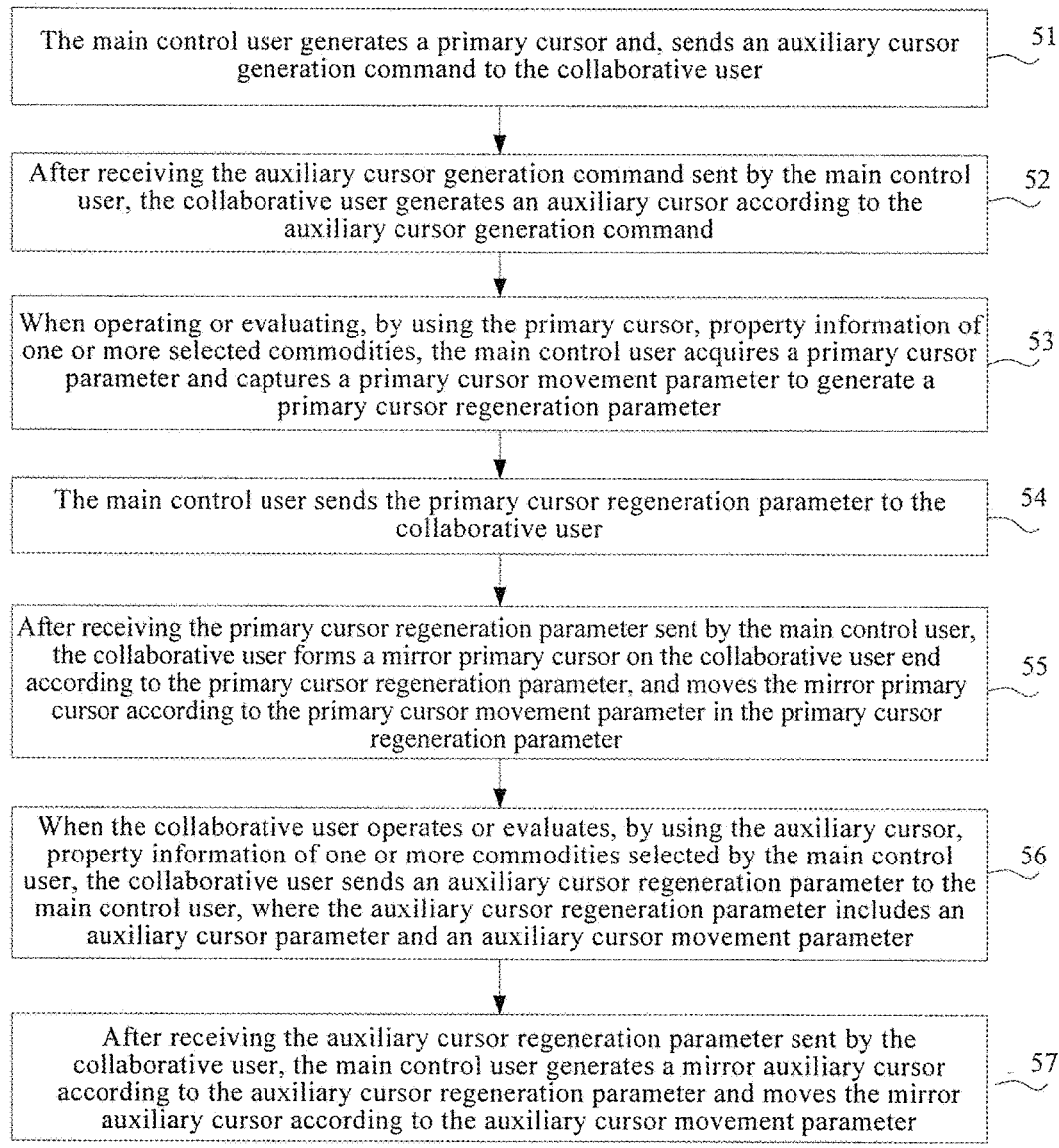
FIG. 5 is a flowchart of another real-time exchange method by sharing a cursor by a main control user and a collaborative user according to an embodiment of the present invention.

FIG. 5 is a flowchart of another real-time exchange method by sharing a cursor by a main control user and a collaborative user according to an embodiment of the present invention. As shown in FIG. 5, the method provided in this embodiment includes:

Step 51: The main control user generates a primary cursor, and sends an auxiliary cursor generation command to the collaborative user.

Step 52: After receiving the auxiliary cursor generation command sent by the main control user, the collaborative user generates an auxiliary cursor according to the auxiliary cursor generation command.

Step 53: When operating or evaluating, by using the primary cursor, property information of one or more selected commodities, the main control user acquires a primary cursor parameter and captures a primary cursor movement parameter to generate a primary cursor regeneration parameter.

Step 54: The main control user sends the primary cursor regeneration parameter to the collaborative user.

Step 55: After receiving the primary cursor regeneration parameter sent by the main control user, the collaborative user forms a mirror primary cursor on the collaborative user end according to the primary cursor regeneration parameter, and moves the mirror primary cursor according to the primary cursor movement parameter in the primary cursor regeneration parameter.

Step 56: When the collaborative user operates or evaluates, by using the auxiliary cursor, property information of one or more commodities selected by the main control user, the collaborative user sends an auxiliary cursor regeneration parameter to the main control user, where the auxiliary cursor regeneration parameter includes an auxiliary cursor parameter and an auxiliary cursor movement parameter.

An appearance of the auxiliary cursor is different from an appearance of the primary cursor, and meanwhile, a unique identifier of a friend exists beside each auxiliary cursor. The auxiliary cursor mainly helps a user and a friend locate some areas of a commodity, so as to facilitate communication during collaborative shopping.

Step 57: After receiving the auxiliary cursor regeneration parameter sent by the collaborative user, the main control user generates a mirror auxiliary cursor according to the auxiliary cursor regeneration parameter, and moves the mirror auxiliary cursor according to the auxiliary cursor movement parameter.

For example, when the collaborative user uses the auxiliary cursor to locate some areas of a commodity on a collaborative shopping interface, a collaborative shopping interface of the main control user synchronously displays mark content of the auxiliary cursor of the collaborative user. Similarly, when the main control user uses the primary cursor to locate some areas of a commodity on the collaborative shopping interface, the collaborative shopping interface of the collaborative user synchronously displays a movement process of the primary cursor of the main control user.

For another example, when the collaborative user zooms in or zooms out on a commodity picture on the collaborative shopping interface, a commodity picture presented on the collaborative shopping interface of the main control user is synchronously zoomed in or zoomed out. Similarly, when the main control user zooms in or zooms out on a commodity picture on the collaborative shopping interface, the commodity picture presented on the collaborative shopping interface of the collaborative user is also synchronously zoomed in or zoomed out.

Through the method provided in this embodiment, a mirror primary cursor on a collaborative user end synchronously moves with a primary cursor of a main control user, so that the collaborative user may acquire, in real time, operation information or evaluation information of property information of one or more commodities selected by the main control user. Similarly, a mirror auxiliary cursor of the main control user synchronously moves with an auxiliary cursor of the collaborative user, so that the main control user may acquire, in real time, the operation information or evaluation information of the property information of the one or more commodities selected by the main control user. Therefore, through the method provided in this embodiment, the main control user and the collaborative user may perform communication in real time during a shopping process, thereby implementing cooperative and collaborative shopping.

Figure 6:
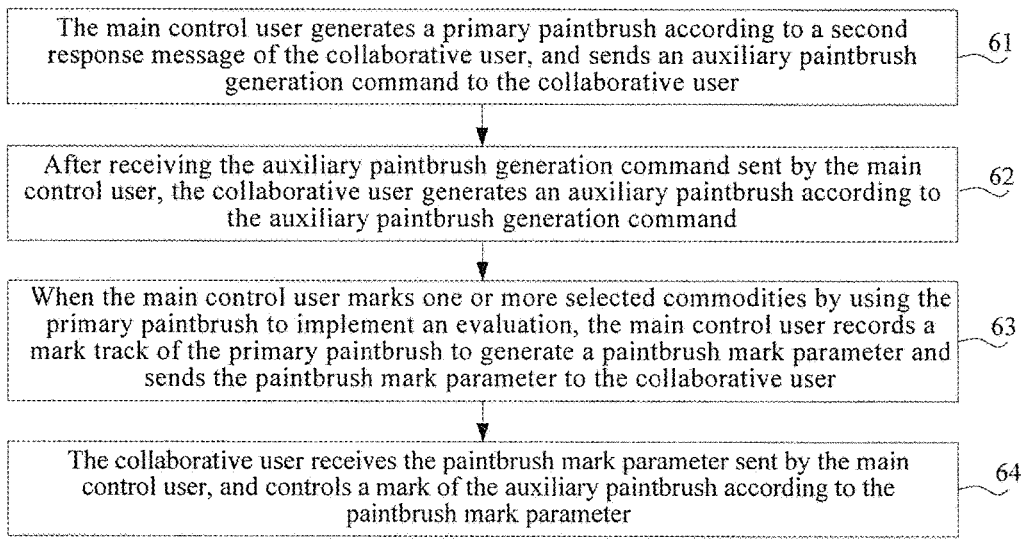
FIG. 6 is a flowchart of a real-time exchange method by using a paintbrush by a main control user and a collaborative user according to an embodiment of the present invention.

FIG. 6 is a flowchart of a real-time exchange method by using a paintbrush by a main control user and a collaborative user according to an embodiment of the present invention. As shown in FIG. 6, the method provided in this embodiment includes:

Step 61: The main control user generates a primary paintbrush according to a second response message of the collaborative user, and sends an auxiliary paintbrush generation command to the collaborative user.

Step 62: After receiving the auxiliary paintbrush generation command sent by the main control user, the collaborative user generates an auxiliary paintbrush according to the auxiliary paintbrush generation command.

Step 63: When the main control user marks one or more selected commodities by using the primary paintbrush to implement an evaluation, the main control user records a mark track of the primary paintbrush to generate a paintbrush mark parameter, and sends the paintbrush mark parameter to the collaborative user.

Step 64: The collaborative user receives the paintbrush mark parameter sent by the main control user, and controls a mark of the auxiliary paintbrush according to the paintbrush mark parameter.

According to the method provided in this embodiment, when a main control user marks one or more selected commodities by using a primary paintbrush to implement an evaluation, an auxiliary paintbrush of a collaborative user is also used to mark a corresponding commodity, so that a mark of the main control user may be displayed on the collaborative user end in real time.

Figure 7:
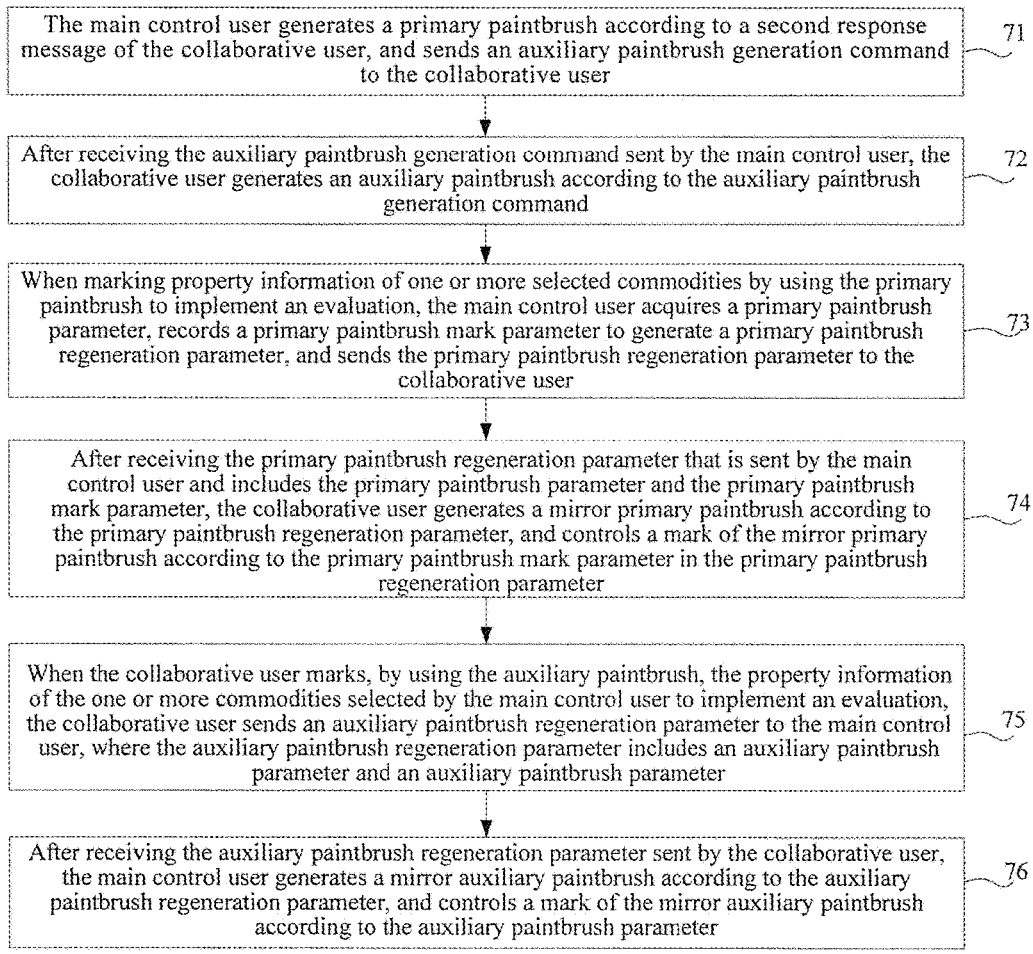
FIG. 7 is a flowchart of another real-time exchange method by using a paintbrush by a main control user and a collaborative user according to an embodiment of the present invention.

FIG. 7 is a flowchart of another real-time exchange method by using a paintbrush by a main control user and a collaborative user according to an embodiment of the present invention. As shown in FIG. 7, the method provided in this embodiment includes:

Step 71: The main control user generates a primary paintbrush according to a second response message of the collaborative user, and sends an auxiliary paintbrush generation command to the collaborative user.

Step 72: After receiving the auxiliary paintbrush generation command sent by the main control user, the collaborative user generates an auxiliary paintbrush according to the auxiliary paintbrush generation command.

Step 73: When marking property information of one or more selected commodities by using the primary paintbrush to implement an evaluation, the main control user acquires a primary paintbrush parameter, records a primary paintbrush mark parameter to generate a primary paintbrush regeneration parameter, and sends the primary paintbrush regeneration parameter to the collaborative user.

Step 74: After receiving the primary paintbrush regeneration parameter that is sent by the main control user and includes the primary paintbrush parameter and the primary paintbrush mark parameter, the collaborative user generates a mirror primary paintbrush according to the primary paintbrush regeneration parameter, and controls a mark of the mirror primary paintbrush according to the primary paintbrush mark parameter in the primary paintbrush regeneration parameter.

Step 75: When the collaborative user marks, by using the auxiliary paintbrush, the property information of the one or more commodities selected by the main control user to implement an evaluation, the collaborative user sends an auxiliary paintbrush regeneration parameter to the main control user, where the auxiliary paintbrush regeneration parameter includes an auxiliary paintbrush parameter and an auxiliary paintbrush mark parameter.

Step 76: After receiving the auxiliary paintbrush regeneration parameter sent by the collaborative user, the main control user generates a mirror auxiliary paintbrush according to the auxiliary paintbrush regeneration parameter, and controls a mark of the mirror auxiliary paintbrush according to the auxiliary paintbrush parameter.

Through the method provided in this embodiment, when a main control user marks one or more selected commodities by using a primary paintbrush to display an evaluation, a collaborative user also marks a corresponding commodity by using a mirror primary paintbrush, so that a mark of the main control user may be displayed on the collaborative user end in real time. Similarly, when the collaborative user marks the one or more selected commodities by using an auxiliary paintbrush to display an evaluation, an mirror auxiliary paintbrush of the main control user also marks a corresponding commodity by using an mirror auxiliary paintbrush, so that a mark of the collaborative user may be displayed on the main control user end in real time.

Figure 8A:
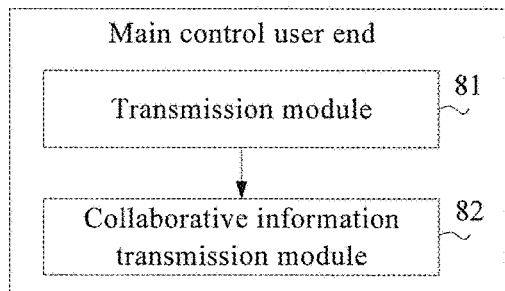
FIG. 8A is a schematic structural diagram of a main control user end according to an embodiment of the present invention.

FIG. 8A is a schematic structural diagram of a main control user end according to an embodiment of the present invention. As shown in FIG. 8A, the main control user end provided in this embodiment includes a transmission module 81 and a collaborative information transmission module 82.

The transmission module 81 is configured to send a collaborative shopping request message, where the collaborative shopping request message includes one or more user identifiers, and the one or more user identifiers are used to determine a collaborative user requested to collaborate in shopping.

The transmission module 81 is further configured to receive a first response message for responding to the collaborative shopping request message by the collaborative user corresponding to the one or more user identifiers, and send the first response message to the collaborative information transmission module.

The collaborative information transmission module 82 is configured to transmit collaborative information to the collaborative user according to the first response message, where the collaborative information includes shopping information of the main control user, so that the collaborative user synchronously shares or acquires the shopping information of the main control user; or configured to receive, according to the first response message, collaborative information sent by the collaborative user, so that the main control user synchronously shares or acquires shopping information of the collaborative user, where the collaborative information includes the shopping information of the collaborative user.

Preferably, the shopping information includes link information of a current shopping interface of the main control user, so that the collaborative user presents the current shopping interface of the main control user.

Preferably, the current shopping interface is an interface presenting property information of one or more commodities selected by the main control user.

Preferably, the property information includes several fields. The fields separately indicate commodity specification information, commodity color information, commodity style information, and commodity price information.

Figure 8B:
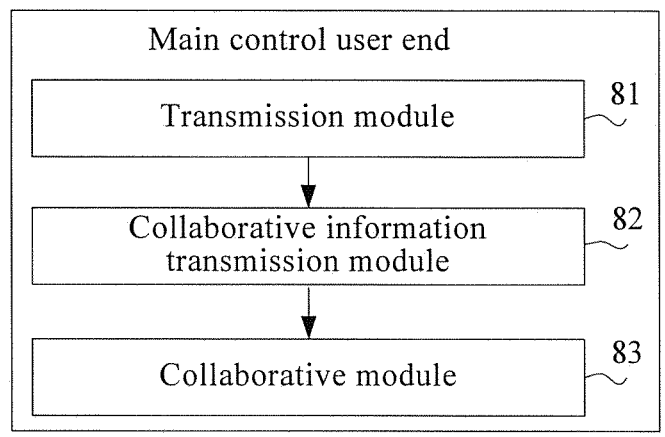
FIG. 8B is a schematic structural diagram of another main control user end according to an embodiment of the present invention.

Based on the embodiment corresponding to FIG. 8A, a collaborative user end may synchronously share the shopping information of the main control user. As shown in FIG. 8B, the main control user end provided in this embodiment further includes a collaborative module 83.

The transmission module 81 is further configured to send an interactive assistance request to the collaborative user.

The transmission module 81 is further configured to receive, from the collaborative user, a second response message for the interactive assistance request, and send the second response message to the collaborative module 82.

The collaborative module 83 is configured to establish a real-time exchange channel with the collaborative user according to the second response message of the collaborative user, so as to exchange, with the collaborative user in real time, operation information or evaluation information of the one or more commodities selected by the main control user.

Preferably, the collaborative user end and the main control user end exchange, in real time by sharing a cursor and/or through voice communication, the operation information or evaluation information of the one or more commodities selected by the main control user. Therefore, the collaborative module 83 is further configured to exchange, with the collaborative user in real time according to the second response message of the collaborative user and by sharing a cursor or through voice communication or both by sharing a cursor and through voice communication with the collaborative user, the operation information or evaluation information of the one or more commodities selected by the main control user.

In an implementation manner for sharing a cursor by the collaborative user end and the main control user end, in a case that the collaborative user end shares a cursor of the main control user end, the collaborative module 83 is further configured to generate a primary cursor according to the second response message of the collaborative user, and send an auxiliary cursor generation command to the collaborative user, so that the collaborative user generates an auxiliary cursor according to the auxiliary cursor generation command; capture a movement track of the primary cursor when an operation or an evaluation is performed, by using the primary cursor, on the one or more selected commodities, so as to generate a cursor movement parameter; and send the cursor movement parameter to the collaborative user, so that the collaborative user moves the auxiliary cursor according to the cursor movement parameter.

In another implementation manner for sharing a cursor by the collaborative user end and the main control user end, in a case that the main control user end and the collaborative user end mutually share a cursor of the other side:

the collaborative module 83 is further configured to generate a primary cursor according to the second response message of the collaborative user, and send an auxiliary cursor generation command to the collaborative user, so that the collaborative user generates an auxiliary cursor according to the auxiliary cursor generation command;

the collaborative module 83 is further configured to, when an operation or an evaluation is performed, by using the primary cursor, on the property information of the one or more selected commodities, acquire a primary cursor parameter and capture the primary cursor movement parameter to generate a primary cursor regeneration parameter;

the collaborative module 83 is further configured to send the primary cursor regeneration parameter to the collaborative user, so that the collaborative user forms a mirror primary cursor on the collaborative user end according to the primary cursor regeneration parameter and moves the mirror primary cursor according to the primary cursor movement parameter in the primary cursor regeneration parameter;

the collaborative module 83 is further configured to, when the collaborative user operates or evaluates, by using the auxiliary cursor, the property information of the one or more commodities selected by the main control user, receive an auxiliary cursor regeneration parameter sent by the collaborative user, where the auxiliary cursor regeneration parameter includes an auxiliary cursor parameter and an auxiliary cursor movement parameter; and the collaborative module 83 is further configured to generate a mirror auxiliary cursor according to the auxiliary cursor regeneration parameter, and move the mirror auxiliary cursor according to the auxiliary cursor movement parameter.

Preferably, the collaborative user end and the main control user end may further exchange, in real time by sharing a paintbrush, the evaluation information of the one or more commodities selected by the main control user. The collaborative module 83 further includes the following function:

the collaborative module 83 is further configured to exchange, with the collaborative user in real time according to the second response message of the collaborative user and by using a paintbrush, the evaluation information of the property information of the one or more commodities selected by the main control user.

In an implementation manner for implementing an exchange by sharing a paintbrush by the collaborative user end and the main control user end, when the main control user end uses a paintbrush to perform a mark, the collaborative user end shares the paintbrush of the main control user end. Therefore, the collaborative module 83 further includes the following functions:

the collaborative module 83 is further configured to generate a primary paintbrush according to the second response message of the collaborative user, and send an auxiliary paintbrush generation command to the collaborative user, so that the collaborative user generates an auxiliary paintbrush according to the auxiliary paintbrush generation command; and the collaborative module 83 is further configured to, when the one or more selected commodities are marked by using the primary paintbrush to implement an evaluation, record a mark track of the primary paintbrush to generate a paintbrush mark parameter, and send the paintbrush mark parameter to the collaborative user, so that the collaborative user controls a mark of the auxiliary paintbrush according to the paintbrush mark parameter.

In another implementation manner for implementing an exchange by sharing a paintbrush by the collaborative user end and the main control user end, when the main control user end uses a paintbrush to perform a mark, the collaborative user end shares the paintbrush of the main control user end. When the collaborative user end uses a paintbrush to perform a mark, the main control user end shares the paintbrush of the collaborative user end. Therefore, the collaborative module 83 further includes the following functions:

the collaborative module 83 is further configured to generate a primary paintbrush according to the second response message of the collaborative user, and send an auxiliary paintbrush generation command to the collaborative user, so that the collaborative user generates an auxiliary paintbrush according to the auxiliary paintbrush generation command;

the collaborative module 83 is further configured to, when the property information of the one or more selected commodities is marked by using the primary paintbrush to implement an evaluation, acquire a primary paintbrush parameter and record a primary paintbrush mark parameter to generate a primary paintbrush regeneration parameter;

the collaborative module 83 is further configured to send the primary paintbrush regeneration parameter to the collaborative user, so that the collaborative user forms a mirror primary paintbrush on the collaborative user end according to the primary paintbrush regeneration parameter and controls a mark of the mirror primary paintbrush according to the primary paintbrush mark parameter in the primary paintbrush regeneration parameter;

the collaborative module 83 is further configured to, when the property information of the one or more commodities selected by the main control user is marked by using the auxiliary paintbrush to implement an evaluation, receive an auxiliary paintbrush regeneration parameter sent by the collaborative user, where the auxiliary paintbrush regeneration parameter includes an auxiliary paintbrush parameter and an auxiliary paintbrush parameter; and the collaborative module 83 is further configured to generate a mirror auxiliary paintbrush according to the auxiliary paintbrush regeneration parameter, and control a mark of the mirror auxiliary paintbrush according to the auxiliary paintbrush parameter.

In this embodiment corresponding to FIG. 8A, the collaborative user end may further asynchronously share the shopping information of the main control user end. In this case, the collaborative information transmission module 82 further includes the following function:

the collaborative information transmission module 82 is further configured to, after the main control user transmits the collaborative information to the collaborative user according to the first response message, send the collaborative user a parameter of a virtual shopping basket and an association relationship between the virtual shopping basket and the one or more commodities selected by the main control user, so that the collaborative user generates a virtual shopping basket associated with the one or more commodities.

Further, the collaborative user end may further acquire a virtual shopping basket of the main control user end. Therefore, the collaborative information transmission module 82 is further configured to, after the main control user transmits the collaborative information to the collaborative user according to the first response message, send the collaborative user the parameter of the virtual shopping basket and the association relationship between the virtual shopping basket and the one or more commodities selected by the main control user, so that the collaborative user generates the virtual shopping basket associated with the target commodity.

Figure 8C:
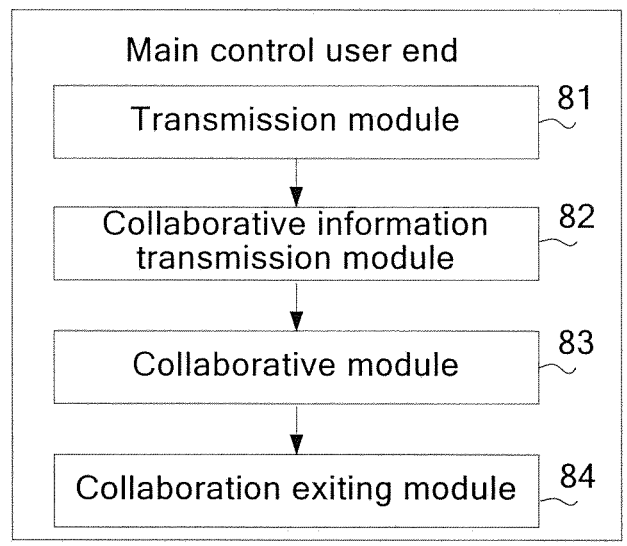
FIG. 8C is a schematic structural diagram of still another main control user end according to an embodiment of the present invention.

Based on this embodiment, the main control user or the collaborative user may further proactively exit collaborative shopping. As shown in FIG. 8C, the main control user end may further include a collaboration exiting module 84.

The collaboration exiting module 84 is configured to, after the collaborative information transmission module transmits the collaborative information to the collaborative user according to the first response message, send or receive a request for exiting a collaborative shopping interface to the collaborative user end or from the collaborative user end.

Figure 9A:
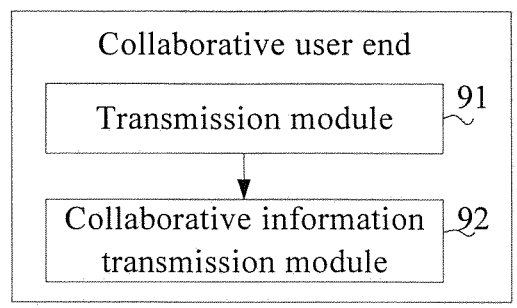
FIG. 9A is a schematic structural diagram of a collaborative user end according to an embodiment of the present invention.

FIG. 9A is a schematic structural diagram of a collaborative user end according to an embodiment of the present invention. As shown in FIG. 9A, the collaborative user end provided in this embodiment includes a transmission module 91 and a collaborative information transmission module 92.

The transmission module 91 is configured to receive a collaborative shopping request message sent by a main control user, where the collaborative shopping request message includes one or more user identifiers, and the one or more user identifiers are used to determine a collaborative user requested to collaborate in shopping.

The transmission module 91 is further configured to send to the main control user with a first response message for responding to the collaborative shopping request message.

The collaborative information transmission module 92 is configured to, after the transmission module 91 sends to the main control user with the first response message for responding to the collaborative shopping request message, receive collaborative information transmitted by the main control user according to the first response message, so as to synchronously share or acquire shopping information of the main control user, where the collaborative information includes the shopping information of the main control user; or send collaborative information to the main control user, where the collaborative information includes shopping information of the collaborative user, so that the main control user synchronously shares or acquires the shopping information of the collaborative user.

Preferably, the shopping information includes link information of a current shopping interface of the main control user, so that the collaborative user presents the current shopping interface of the main control user.

Preferably, the current shopping interface is an interface presenting property information of one or more commodities selected by the main control user.

Preferably, the property information includes several fields. The fields separately indicate commodity specification information, commodity color information, commodity style information, and commodity price information.

Figure 9B:
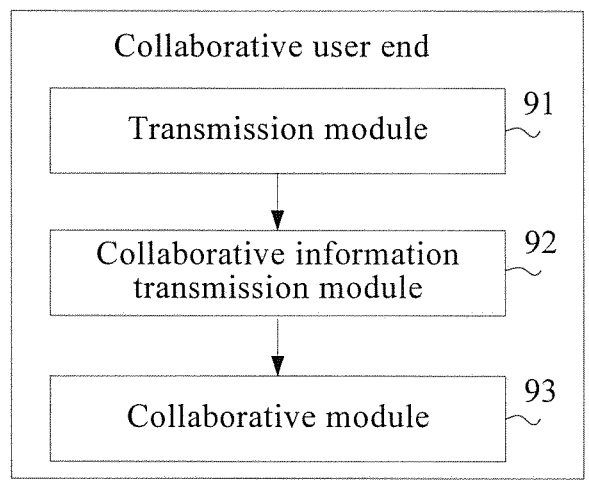
FIG. 9B is a schematic structural diagram of another collaborative user end according to an embodiment of the present invention.

Based on the embodiment corresponding to FIG. 9A, the collaborative user end may synchronously share shopping information of a main control user end. As shown in FIG. 9B, the collaborative user end provided in this embodiment further includes a collaborative module 93.

The transmission module 91 is configured to, after the collaborative information receives the collaborative information transmitted by the main control user according to the first response message, receive an interactive assistance request sent by the main control user.

The transmission module 91 is further configured to send the main control user a second response message for the interactive assistance request, so that the main control user establishes a real-time exchange channel with the collaborative user according to the second response message.

The collaborative module 93 is configured to, after the transmission module 91 sends the main control user the second response message for the interactive assistance request, establish a real-time exchange channel with the main control user, and exchange, with the main control user in real time through the exchange channel, operation information or evaluation information of the one or more commodities selected by the main control user.

Preferably, the collaborative user end and the main control user end exchange, in real time by sharing a cursor and/or through voice communication, the operation information or evaluation information of the one or more commodities selected by the main control user.

The collaborative module 93 is further configured to exchange, with the main control user in real time by sharing a cursor or through voice communication or both by sharing a cursor and through voice communication, the operation information or evaluation information of the property information of the one or more commodities selected by the main control user.

In an implementation manner for sharing a cursor by the collaborative user end and the main control user end, in a case that the collaborative user end shares a cursor of the main control user end:

the collaborative module 93 is further configured to generate an auxiliary cursor according to an auxiliary cursor generation command after receiving the auxiliary cursor generation command sent by the main control user; and the collaborative module 93 is further configured to, when an operation or an evaluation is performed, by using a primary cursor, on the property information of the one or more selected commodities, receive a cursor movement parameter sent by the main control user and move the auxiliary cursor according to the cursor movement parameter.

In another implementation manner for sharing a cursor by the collaborative user end and the main control user end, in a case that the main control user end and the collaborative user end mutually share a cursor of the other side:

the collaborative module 93 is further configured to generate an auxiliary cursor according to an auxiliary cursor generation command after receiving the auxiliary cursor generation command sent by the main control user;

the collaborative module 93 is further configured to, when an operation or an evaluation is performed, by using a primary cursor, on the property information of the one or more selected commodities, receive a primary cursor regeneration parameter sent by the main control user, form a mirror primary cursor on the collaborative user end according to the primary cursor regeneration parameter, and move the mirror primary cursor according to a primary cursor movement parameter in the primary cursor regeneration parameter; and the collaborative module 93 is further configured to, when an operation or an evaluation is performed, by using the auxiliary cursor, on the property information of the one or more commodities selected by the main control user, send an auxiliary cursor regeneration parameter to the main control user, so that the main control user generates a mirror auxiliary cursor according to the auxiliary cursor regeneration parameter and moves the mirror auxiliary cursor according to an auxiliary cursor movement parameter, where the auxiliary cursor regeneration parameter includes an auxiliary cursor parameter and the auxiliary cursor movement parameter.

Preferably, the collaborative user end and the main control user end may further exchange, in real time by sharing a paintbrush, the evaluation information of the one or more commodities selected by the main control user. The collaborative module 93 further includes the following function:

the collaborative module 93 is configured to exchange, with the main control user in real time by using a paintbrush, the evaluation information of the property information of the one or more commodities selected by the main control user.

In an implementation manner for implementing an exchange by sharing a paintbrush by the collaborative user end and the main control user end, when the main control user end uses a paintbrush to perform a mark, the collaborative user end shares the paintbrush of the main control user end. Therefore, the collaborative module 93 further includes the following functions:

the collaborative module 93 is further configured to generate an auxiliary paintbrush according to an auxiliary paintbrush generation command after receiving the auxiliary paintbrush generation command sent by the main control user; and the collaborative module 93 is further configured to, when the main control user marks the one or more selected commodities by using a primary paintbrush to implement an evaluation, receive a paintbrush mark parameter sent by the main control user, and control a mark of the auxiliary paintbrush according to the paintbrush mark parameter.

In another implementation manner for implementing an exchange by sharing a paintbrush by the collaborative user end and the main control user end, when the main control user end uses a paintbrush to perform a mark, the collaborative user end shares the paintbrush of the main control user end. When the collaborative user end uses a paintbrush to perform a mark, the main control user end shares the paintbrush of the collaborative user end. Therefore, the collaborative module 93 further includes the following functions:

the collaborative module 93 is further configured to generate an auxiliary paintbrush according to an auxiliary paintbrush generation command after receiving the auxiliary paintbrush generation command sent by the main control user;

the collaborative module 93 is further configured to, when the main control user marks the property information of the one or more selected commodities by using a primary paintbrush to implement an evaluation, receive a primary paintbrush regeneration parameter that is sent by the main control user and includes a primary paintbrush parameter and a primary paintbrush mark parameter;

the collaborative module 93 is further configured to generate a mirror primary paintbrush according to the primary paintbrush regeneration parameter, and control a mark of the mirror primary paintbrush according to the primary paintbrush mark parameter in the primary paintbrush regeneration parameter; and the collaborative module 93 is further configured to send an auxiliary paintbrush regeneration parameter to the main control user when the property information of the one or more commodities selected by the main control user is marked by using the auxiliary paintbrush to implement an evaluation, where the auxiliary paintbrush regeneration parameter includes an auxiliary paintbrush parameter and an auxiliary paintbrush parameter, so that the main control user generates a mirror auxiliary paintbrush according to the auxiliary paintbrush regeneration parameter and controls a mark of the mirror auxiliary paintbrush according to the auxiliary paintbrush parameter.

In this embodiment corresponding to FIG. 9A, the collaborative user end may further asynchronously share the shopping information of the main control user end. In this case, the collaborative information transmission module 92 further includes the following function:

the collaborative information transmission module 92 is further configured to receive, through a virtual shopping basket, e-mail, or a message receiver box, the property information of the one or more commodities selected by the main control user.

Further, the collaborative user end may further acquire a virtual shopping basket of the main control user end. Therefore, the collaborative information transmission module 92 is further configured to generate a virtual shopping basket associated with the one or more commodities after receiving a parameter of a virtual shopping basket and an association relationship between the virtual shopping basket and the one or more commodities selected by the main control user that are sent by the main control user.

Figure 9C:
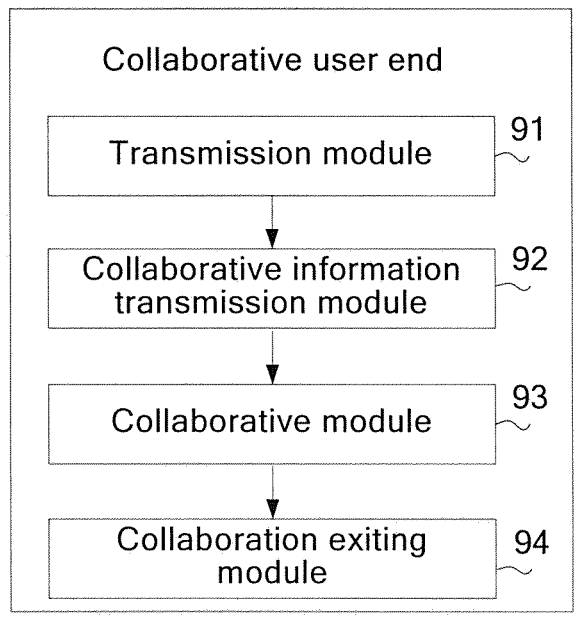
FIG. 9C is a schematic structural diagram of still another collaborative user end according to an embodiment of the present invention.

Based on this embodiment, the main control user or the collaborative user may further proactively exit collaborative shopping. As shown in FIG. 9C, the collaborative user end may further include a collaboration exiting module 94.

The collaboration exiting module 94 is configured to, after the collaborative information sent by the collaborative information transmission module is received, send or receive a request for exiting a collaborative shopping interface to the main control user end or from the main control user end.

Figure 10:
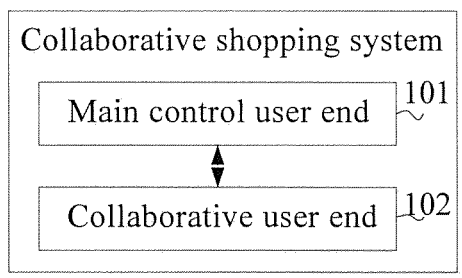
FIG. 10 is a schematic structural diagram of a collaborative shopping system according to an embodiment of the present invention.

FIG. 10 is a schematic structural diagram of a collaborative shopping system according to an embodiment of the present invention. As shown in FIG. 10, the system includes a main control user end 101 and a collaborative user end 102. For the main control user end 101, reference may be made to the main control user ends in the embodiments corresponding to FIG. 8A to FIG. 8C. For the collaborative user end 102, reference may be made to the collaborative user ends in the embodiments corresponding to FIG. 9A to FIG. 9C.

Figure 11:
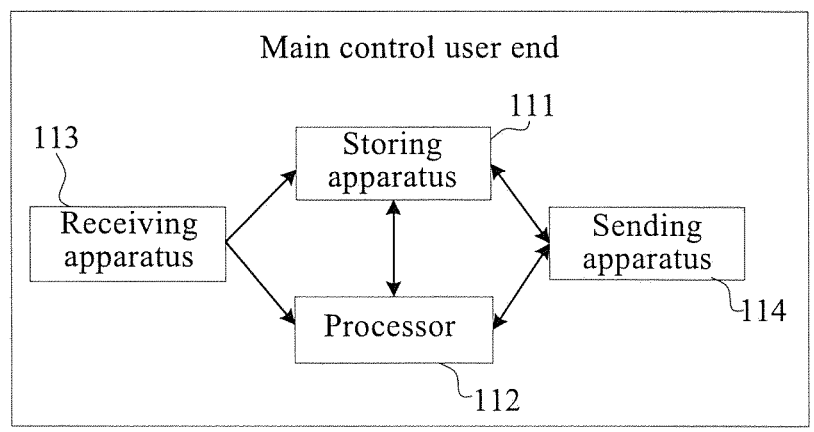
FIG. 11 is a schematic structural diagram of still another main control user end according to an embodiment of the present invention.

As shown in FIG. 11, an embodiment of the present invention further provides still another main control user end. The main control user end includes:

a receiving apparatus 113, configured to receive information;

a sending apparatus 114, configured to send information;

a storing apparatus 111, configured to store a computer program instruction; and a processor 112, configured to execute the computer program instruction stored in the storing apparatus.

The computer program instruction includes:

sending, by using the sending apparatus 114, a collaborative shopping request message, where the collaborative shopping request message includes one or more user identifiers, and the one or more user identifiers are used to determine a collaborative user requested to collaborate in shopping;

receiving, by using the receiving apparatus 113, a first response message for responding to the collaborative shopping request message by the collaborative user corresponding to the one or more user identifiers; and transmitting, by using the sending apparatus 114, collaborative information to the collaborative user according to the first response message, where the collaborative information includes shopping information of the main control user, so that the collaborative user synchronously shares or acquires the shopping information of the main control user; or receiving, by using the receiving apparatus 113 according to the first response message, collaborative information sent by the collaborative user, so that the main control user synchronously shares or acquires shopping information of the collaborative user, where the collaborative information includes the shopping information of the collaborative user.

Preferably, the shopping information includes link information of a current shopping interface of the main control user, so that the collaborative user presents the current shopping interface of the main control user.

Preferably, the current shopping interface is an interface presenting property information of one or more commodities selected by the main control user.

Preferably, the property information includes several fields. The fields separately indicate commodity specification information, commodity color information, commodity style information, and commodity price information.

After the main control user transmits the collaborative information to the collaborative user according to the first response message, the following is further included:

sending an interactive assistance request to the collaborative user;

receiving, from the collaborative user, a second response message for the interactive assistance request; and establishing a real-time exchange channel with the collaborative user according to the second response message of the collaborative user, so as to exchange, with the collaborative user in real time, operation information or evaluation information of the one or more commodities selected by the main control user.

The establishing a real-time exchange channel with the collaborative user according to the second response message of the collaborative user includes:

exchanging, with the collaborative user in real time according to the second response message of the collaborative user and by sharing a cursor or through voice communication or both by sharing a cursor and through voice communication with the collaborative user, the operation information or evaluation information of the property information of the one or more commodities selected by the main control user.

The exchanging, with the collaborative user in real time according to the second response message of the collaborative user and by sharing a cursor with the collaborative user, the operation information or evaluation information of the one or more commodities selected by the main control user includes:

generating a primary cursor according to the second response message of the collaborative user, and sending an auxiliary cursor generation command to the collaborative user, so that the collaborative user generates an auxiliary cursor according to the auxiliary cursor generation command; and capturing, by the main control user, a movement track of the primary cursor when an operation or an evaluation is performed, by using the primary cursor, on the property information of the one or more selected commodities, so as to generate a cursor movement parameter and send the cursor movement parameter to the collaborative user, so that the collaborative user moves the auxiliary cursor according to the cursor movement parameter.

The exchanging, with the collaborative user in real time according to the second response message of the collaborative user and by sharing a cursor with the collaborative user, the operation information or evaluation information of the one or more commodities selected by the main control user includes:

generating a primary cursor according to the second response message of the collaborative user, and sending an auxiliary cursor generation command to the collaborative user, so that the collaborative user generates an auxiliary cursor according to the auxiliary cursor generation command;

acquiring a primary cursor parameter and capturing a primary cursor movement parameter to generate a primary cursor regeneration parameter when an operation or an evaluation is performed, by using the primary cursor, on the property information of the one or more selected commodities;

sending the primary cursor regeneration parameter to the collaborative user, so that the collaborative user forms a mirror primary cursor on the collaborative user end according to the primary cursor regeneration parameter and moves the mirror primary cursor according to the primary cursor movement parameter in the primary cursor regeneration parameter;

receiving, by the main control user, an auxiliary cursor regeneration parameter sent by the collaborative user when an operation or an evaluation is performed, by using the auxiliary cursor, on the property information of the one or more commodities selected by the main control user, where the auxiliary cursor regeneration parameter includes an auxiliary cursor parameter and an auxiliary cursor movement parameter; and generating a mirror auxiliary cursor according to the auxiliary cursor regeneration parameter, and moving the mirror auxiliary cursor according to the auxiliary cursor movement parameter.

The establishing a real-time exchange channel with the collaborative user according to the second response message of the collaborative user includes:

exchanging, with the collaborative user in real time according to the second response message of the collaborative user and by using a paintbrush, the evaluation information of the one or more commodities selected by the main control user.

The exchanging, with the collaborative user in real time according to the second response message of the collaborative user and by using a paintbrush, the evaluation information of the one or more commodities selected by the main control user includes:

generating a primary paintbrush according to the second response message of the collaborative user, and sending an auxiliary paintbrush generation command to the collaborative user, so that the collaborative user generates an auxiliary paintbrush according to the auxiliary paintbrush generation command; and recording a mark track of the primary paintbrush to generate a paintbrush mark parameter and sending the paintbrush mark parameter to the collaborative user when the one or more selected commodities are marked by using the primary paintbrush to implement an evaluation, so that the collaborative user controls a mark of the auxiliary paintbrush according to the paintbrush mark parameter.

The exchanging, with the collaborative user in real time according to the second response message of the collaborative user and by using a paintbrush, the evaluation information of the one or more commodities selected by the main control user includes:

generating a primary paintbrush according to the second response message of the collaborative user, and sending an auxiliary paintbrush generation command to the collaborative user, so that the collaborative user generates an auxiliary paintbrush according to the auxiliary paintbrush generation command;

acquiring a primary paintbrush parameter and recording a primary paintbrush mark parameter to generate a primary paintbrush regeneration parameter when the property information of the one or more selected commodities is marked by using the primary paintbrush to implement an evaluation;

sending the primary paintbrush regeneration parameter to the collaborative user, so that the collaborative user forms a mirror primary paintbrush on the collaborative user end according to the primary paintbrush regeneration parameter and controls a mark of the mirror primary paintbrush according to the primary paintbrush mark parameter in the primary paintbrush regeneration parameter;

receiving, by the main control user, an auxiliary paintbrush regeneration parameter sent by the collaborative user when the collaborative user marks, by using the auxiliary paintbrush, the property information of the one or more commodities selected by the main control user to implement an evaluation, where the auxiliary paintbrush regeneration parameter includes an auxiliary paintbrush parameter and an auxiliary paintbrush parameter; and generating a mirror auxiliary paintbrush according to the auxiliary paintbrush regeneration parameter, and controlling a mark of the mirror auxiliary paintbrush according to the auxiliary paintbrush parameter.

The transmitting collaborative information to the collaborative user according to the first response message includes:

transmitting, according to the first response message, the property information of the one or more commodities selected by the main control user to a virtual shopping basket, e-mail, or a message receiver box of the collaborative user.

After the transmitting collaborative information to the collaborative user according to the first response message, the following is further included:

sending the collaborative user a parameter of a virtual shopping basket and an association relationship between the virtual shopping basket and the one or more commodities selected by the main control user, so that the collaborative user generates a virtual shopping basket associated with the one or more commodities.

After the transmitting collaborative information to the collaborative user according to the first response message, the following is further included:

sending or receiving a request for exiting a collaborative shopping interface to the collaborative user or from the collaborative user end.

Figure 12:
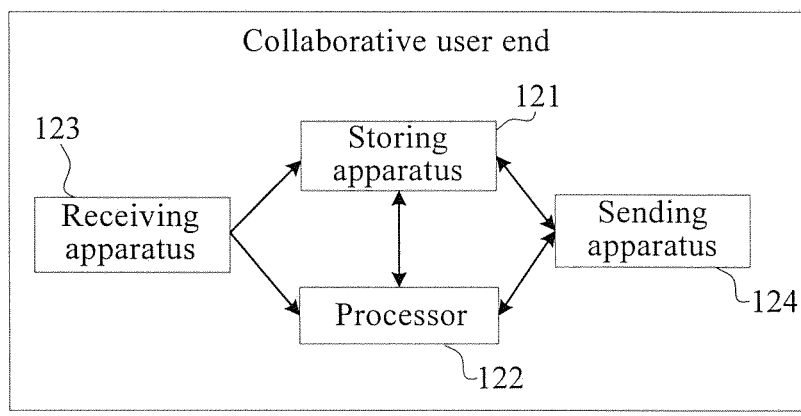
FIG. 12 is a schematic structural diagram of still another collaborative user end according to an embodiment of the present invention.

As shown in FIG. 12, an embodiment of the present invention further provides still another collaborative user end. The collaborative user end includes:

a receiving apparatus 123, configured to receive information;

a sending apparatus 124, configured to send information;

a storing apparatus 121, configured to store a computer program instruction; and a processor 122, configured to execute the computer program instruction stored in the storing apparatus.

The computer program instruction includes the following:

receiving, by using the receiving apparatus 123, a collaborative shopping request message sent by a main control user, where the collaborative shopping request message includes one or more user identifiers, and the one or more user identifiers are used to determine a collaborative user requested to collaborate in shopping;

sending, by using the sending apparatus 124 to the main control user with a first response message for responding to the collaborative shopping request message; and receiving, by using the receiving apparatus 123, collaborative information transmitted by the main control user according to the first response message, so as to synchronously share or acquire shopping information of the main control user, where the collaborative information includes the shopping information of the main control user; or sending, by the collaborative user, collaborative information to the main control user, where the collaborative information includes shopping information of the collaborative user, so that the main control user synchronously shares or acquires the shopping information of the collaborative user.

Preferably, the shopping information includes link information of a current shopping interface of the main control user, so that the collaborative user presents the current shopping interface of the main control user.

Preferably, the current shopping interface is an interface presenting property information of one or more commodities selected by the main control user.

Preferably, the shopping information includes property information of the one or more commodities selected by the main control user, the property information includes several fields, and the fields separately indicate commodity specification information, commodity color information, commodity style information, and commodity price information.

After the receiving collaborative information transmitted by the main control user according to the first response message, the following is further included:

receiving an interactive assistance request sent by the main control user;

sending a second response message for the interactive assistance request to the main control user, so that the main control user establishes a real-time exchange channel with the collaborative user according to the second response message; and exchanging, with the main control user in real time through the exchange channel, operation information or evaluation information of the one or more commodities selected by the main control user.

The establishing a real-time exchange channel with the main control user includes:

exchanging, with the main control user in real time by sharing a cursor or through voice communication or both by sharing a cursor and through voice communication, the operation information or evaluation information of the property information of the one or more commodities selected by the main control user.

The exchanging, with the main control user in real time by sharing a cursor, the operation information or evaluation information of the one or more commodities selected by the main control user includes:

generating an auxiliary cursor according to an auxiliary cursor generation command after the auxiliary cursor generation command sent by the main control user is received; and moving the auxiliary cursor according to a cursor movement parameter when the main control user operates or evaluates the property information of the one or more selected commodities by using a primary cursor and after the cursor movement parameter sent by the main control user is received.

The exchanging, with the main control user in real time by sharing a cursor, the operation information or evaluation information of the one or more commodities selected by the main control user includes:

generating, by the collaborative user, an auxiliary cursor according to an auxiliary cursor generation command after the auxiliary cursor generation command sent by the main control user is received;

receiving, when the main control user operates or evaluates the property information of the one or more selected commodities by using a primary cursor, a primary cursor regeneration parameter sent by the main control user, forming a mirror primary cursor on the collaborative user end according to the primary cursor regeneration parameter, and moving the mirror primary cursor according to a primary cursor movement parameter in the primary cursor regeneration parameter; and sending, by the collaborative user, an auxiliary cursor regeneration parameter to the main control user when an operation or an evaluation is performed, by using the auxiliary cursor, on the property information of the one or more commodities selected by the main control user, so that the main control user generates a mirror auxiliary cursor according to the auxiliary cursor regeneration parameter and moves the mirror auxiliary cursor according to an auxiliary cursor movement parameter, where the auxiliary cursor regeneration parameter includes an auxiliary cursor parameter and the auxiliary cursor movement parameter.

The establishing a real-time exchange channel with the main control user includes:

exchanging, by the collaborative user with the main control user in real time by using a paintbrush, the evaluation information of the property information of the one or more commodities selected by the main control user.

The exchanging, with the main control user in real time by using a paintbrush, the evaluation information of the property information of the one or more commodities selected by the main control user includes:

generating an auxiliary paintbrush according to an auxiliary paintbrush generation command after the auxiliary paintbrush generation command sent by the main control user is received; and receiving, when the main control user marks the one or more selected commodities by using a primary paintbrush to implement an evaluation, a paintbrush mark parameter sent by the main control user, and controlling a mark of the auxiliary paintbrush according to the paintbrush mark parameter.

The exchanging, with the main control user in real time by using a paintbrush, the evaluation information of the property information of the one or more commodities selected by the main control user includes:

generating an auxiliary paintbrush according to an auxiliary paintbrush generation command after the auxiliary paintbrush generation command sent by the main control user is received;

receiving, when the main control user marks the property information of the one or more selected commodities by using a primary paintbrush to implement an evaluation, a primary paintbrush regeneration parameter that is sent by the main control user and includes a primary paintbrush parameter and a primary paintbrush mark parameter;

generating a mirror primary paintbrush according to the primary paintbrush regeneration parameter, and controlling a mark of the mirror primary paintbrush according to the primary paintbrush mark parameter in the primary paintbrush regeneration parameter; and sending an auxiliary paintbrush regeneration parameter to the main control user when the property information of the one or more commodities selected by the main control user is marked by using the auxiliary paintbrush to implement an evaluation, where the auxiliary paintbrush regeneration parameter includes an auxiliary paintbrush parameter and an auxiliary paintbrush parameter, so that the main control user generates a mirror auxiliary paintbrush according to the auxiliary paintbrush regeneration parameter and controls a mark of the mirror auxiliary paintbrush according to the auxiliary paintbrush parameter.

The receiving collaborative information transmitted by the main control user includes:

receiving, by the collaborative user through a virtual shopping basket, e-mail, or a message receiver box, the property information of the one or more commodities selected by the main control user.

After the receiving collaborative information transmitted by the main control user according to the first response message, the following is further included:

after the collaborative user receives a parameter of a virtual shopping basket and an association relationship between the virtual shopping basket and the one or more commodities selected by the main control user that are sent by the main control user, generating, by the collaborative user, a virtual shopping basket associated with the one or more commodities.

After the receiving collaborative information transmitted by the main control user according to the first response message, the following is further included:

sending or receiving, by the collaborative user, a request for exiting a collaborative shopping interface to the main control user end or from the main control user end.

A person of ordinary skill in the art may understand that all or a part of the steps of the foregoing method embodiments may be implemented by a program instructing relevant hardware. The foregoing programs may be stored in a computer readable storage medium. When the program runs, the foregoing steps included in the method embodiments are performed. The foregoing storage medium includes various media capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to part of the technical features in the technical solutions described in the foregoing embodiments; however, these modifications or replacements do not make the essence of the corresponding technical solutions depart from the scope of the technical solutions of the embodiments of the present invention.

What is claimed is:

1. An information exchange method for online collaborative shopping, performed by a computing device, the method comprising:

displaying, by the computing device, commodity information to a main control user;

transmitting, to a collaborative user device, information for displaying the commodity information;

sending, by the computing device, an interactive assistance request to the collaborative user device;

receiving, by the computing device, a response message corresponding to the interactive assistance request from the collaborative user device;

establishing, on receipt of the response message, a real-time exchange channel between the computing device and the collaborative user device;

generating, by the computing device, a primary paintbrush, and sending an auxiliary paintbrush generation command to the collaborative user device, wherein an auxiliary paintbrush is generated in accordance with the auxiliary paintbrush generation command by the collaborative user device;

generating, by the computing device, a paintbrush mark parameter, responsive to the main control user marking one or more selected commodities by using the primary paintbrush to implement an evaluation, and sending the paintbrush mark parameter to the collaborative user device, wherein a mirror primary paintbrush mark is generated in accordance with the paintbrush mark parameter by the collaborative user;

receiving, by the computing device, an auxiliary paintbrush regeneration parameter from the collaborative user device after the collaborative user marks property information of the one or more selected commodities by using the auxiliary paintbrush, wherein the auxiliary paintbrush regeneration parameter comprises an auxiliary paintbrush mark parameter; and generating, by the computing device, a mirror auxiliary paintbrush mark according to the auxiliary paintbrush mark parameter.

2. The method according to claim 1, wherein the information for displaying the commodity information comprises link information of a current shopping interface of the computing device.

3. The method according to claim 2, wherein the current shopping interface presents property information of one or more commodities selected by a user.

4. The method according to claim 3, wherein the method further comprises:

sending a parameter of a virtual shopping basket and an association relationship between the virtual shopping basket and the one or more commodities selected by the main control user to the collaborative user device, wherein a virtual shopping basket associated with the one or more commodities is generated in accordance with the parameter and association relationship by the collaborative user device.

5. The method according to claim 3, wherein the property information comprises a plurality of fields, and the fields separately indicate commodity specification information, commodity color information, commodity style information, and commodity price information.

6. A computing device, comprising:

a processor; and memory coupled to the processor, the memory comprising instructions that, when executed by the processor, cause the computing device to:

display commodity information to a main control user, transmit, to a collaborative user device, information for displaying the commodity information, send an interactive assistance request to the collaborative user device, receive a response message corresponding to the interactive assistance request from the collaborative user device, establish, on receipt of the response message, a real-time exchange channel between the computing device and the collaborative user device, generate a primary paintbrush, and sending an auxiliary paintbrush generation command to the collaborative user device, wherein an auxiliary paintbrush is generated in accordance with the auxiliary paintbrush generation command by the collaborative user device, generate a paintbrush mark parameter, responsive to the main control user marking one or more selected commodities by using the primary paintbrush to implement an evaluation, and sending the paintbrush mark parameter to the collaborative user device, wherein a mirror primary paintbrush mark is generated in accordance with the paintbrush mark parameter by the collaborative user, receive an auxiliary paintbrush regeneration parameter from the collaborative user device after the collaborative user marks property information of the one or more selected commodities by using the auxiliary paintbrush, wherein the auxiliary paintbrush regeneration parameter comprises an auxiliary paintbrush mark parameter, and generate a mirror auxiliary paintbrush mark according to the auxiliary paintbrush mark parameter.

7. The computing device according to claim 6, wherein the information for displaying the commodity information comprises link information of a current shopping interface of the computing device.

8. The computing device according to claim 7, wherein the current shopping interface presents property information of one or more commodities selected by a user.

9. The computing device according to claim 8, wherein the property information comprises a plurality of fields, and the fields separately indicate commodity specification information, commodity color information, commodity style information, and commodity price information.

10. The computing device according to claim 6, wherein the instructions, when executed by the processor, cause the computing device to:

send a parameter of a virtual shopping basket and an association relationship between the virtual shopping basket and the one or more selected commodities to the collaborative user device, wherein a virtual shopping basket associated with the one or more selected commodities is generated in accordance with the parameter and association relationship by the collaborative user device.

\* \* \* \* \*